(12) United States Patent
Beechler

(10) Patent No.: US 11,986,913 B1
(45) Date of Patent: May 21, 2024

(54) TOOL AND METHOD FOR STRAIGHTENING CONDENSER FINS

(71) Applicant: Donald Wayne Beechler, Greenwood, IN (US)

(72) Inventor: Donald Wayne Beechler, Greenwood, IN (US)

(*) Notice: Subject to any disclaimer, the term of this patent is extended or adjusted under 35 U.S.C. 154(b) by 0 days.

(21) Appl. No.: 18/106,478

(22) Filed: Feb. 6, 2023

(51) Int. Cl.
    *B23P 15/26*    (2006.01)
    *B21D 53/02*    (2006.01)
    *F25B 39/04*    (2006.01)

(52) U.S. Cl.
    CPC ............ *B23P 15/26* (2013.01); *B21D 53/022* (2013.01); *F25B 39/04* (2013.01)

(58) Field of Classification Search
CPC ......... B23P 15/26; B21D 53/022; B21D 1/00; B21D 1/06; B21D 53/02; F25B 19/04
See application file for complete search history.

(56) References Cited

U.S. PATENT DOCUMENTS

| | | | | |
|---|---|---|---|---|
| 438,413 | A * | 10/1890 | Groves .................... | B21D 1/14 72/457 |
| 2,607,249 | A * | 8/1952 | Johnston .................. | B21D 1/06 72/409.01 |
| 2,818,757 | A * | 1/1958 | Pille ........................ | B21D 1/00 72/457 |
| 2,912,888 | A | 11/1958 | Webb | |
| 2,895,358 | A * | 7/1959 | Johnson ................... | B21D 1/06 72/409.01 |
| 3,041,900 | A * | 7/1962 | Wagner .................... | B21D 1/00 72/457 |
| 3,531,975 | A | 10/1970 | Lance | |
| 3,892,123 | A * | 7/1975 | Baldwin ................. | B21D 53/02 72/478 |
| 4,018,076 | A * | 4/1977 | Wagner .................... | F28G 1/00 72/457 |
| 5,032,347 | A | 7/1991 | Guironnet | |
| 6,338,265 | B1 | 1/2002 | Grigg | |
| 2002/0000039 | A1 | 1/2002 | Grigg | |
| 2004/0108105 | A1 | 6/2004 | Dwyer | |
| 2007/0050221 | A1 | 3/2007 | Singh et al. | |
| 2007/0068546 | A1 * | 3/2007 | Lipawsky .......... | A46B 15/0002 132/119.1 |
| 2019/0178508 | A1 | 6/2019 | Crespo-Calero | |
| 2020/0406325 | A1 | 12/2020 | Bogdan | |

OTHER PUBLICATIONS

Li'l Pals, Double-Sided Comb, undated, manufactured by Chewy.
Top-Paw, Metal Pet Comb, undated.
Magic Coat, Metal Comb, undated, manufactured by Four Paws.
Supercomb, Models T-412, T-418, undated, manufactured by Hilmor Tools.

* cited by examiner

*Primary Examiner* — Jason L Vaughan
(74) *Attorney, Agent, or Firm* — Scott Houtteman; Houtteman Law, LLC

(57) ABSTRACT

A tool or bit with narrow metal pins is disclosed. When the tool is attached to a vibrational source such as a multitool, the pins enter non adjacent grooves, typically grooves every eight fins. The tool is vibrated and advanced through the area of bent fins. The groups of 8 fins are straightened at the margins. The partially straightened fins can then be fully straightened by finishing the area with a standard fin comb.

20 Claims, 6 Drawing Sheets

TOOL AND METHOD FOR STRAIGHTENING CONDENSER FINS

BACKGROUND

Condenser coils, located inside the condenser unit, are a critical components of a central air conditioning system. Condenser coils are located outside of a dwelling and function to draw heat from the refrigerant gas coming out from the dwelling. They remove and dissipate the heat into the surrounding environment. The hot refrigerant gas is pressurized and enters the coils. The pressure and heat dissipation results in the gas condensing into a liquid. The liquid refrigerant is then reintroduced into the dwelling where it absorbs heat, evaporates into a hot gas and the cycle continues.

Condenser coils are metal tubes that typically run through parallel sheets of aluminum fins. The heat is transferred away through the metal tubing to the fins. The heat is further dissipated by a large fan which passes air across the fins and into the surrounding environment.

In order to function efficiently the fin sheets must be clean and relatively free of bent portions which prevent efficient air flow. Dirty fins can be cleaned and restored to their original state. When the fins are significantly bent, however, the typical "repair" is to throw out the damaged coils and install new ones.

One method of repairing dents is the use of a fin comb or fin tool. A repairman can spray the bent fins with dish soap solution to help lubricate the fin comb. Alternatively, he can use a comb made of low friction plastics. The repairman then places the tool at the edge of the damaged area slides the tool into the damage and physically bends the fins back into their original position. The comb must have the same number of blades per inch as the condenser. For example, a comb with eight blades per inch would be used on a condenser coil with eight fins per inch. Some tools come with an array of combs each having different sizes of blades per inch, to be used with different varieties of condenser coils. Using these tools is both time consuming and physically exhausting. It can also result in broken fins.

Another method modifies the comb by adding a vibration mechanism. Unfortunately, this method proves ineffective. At low frequencies the vibrating comb traveled through the fins no differently than the non-vibrating version. At higher frequencies the fins were damaged. The fins, made of delicate aluminum, either split or break away from the coil.

The invention disclosed herein is a device and method that straightened even large regions of severely bent condenser fins with minimal time and effort.

SUMMARY OF THE INVENTION

The invention is a specialized bit or attachment with narrow metal pins that fit in between the fins and vibrate back and forth, and the repair man travels up and down the array of fins. Importantly, the fins enter non adjacent grooves, in a preferred embodiment, the grooves are about 8 fins apart. When the pins are separated at this distance the vibration does not tear the fins apart but partially straightens them. The groups of 8 fins are straightened at the margins. The partially straightened fins can then be fully straightened by finishing the area with a standard fin comb.

DETAILED DESCRIPTION OF THE INVENTION

As described above when a repair person uses a vibrating comb to repair a condenser coil array the results are no better than with a non-vibrating comb. The results improved dramatically, however, when several changes are made to the standard friction free fin repair comb. First, instead of friction free tines, a tool is designed with metal pins. Second the pins spaced so that they enter the grooves between non adjacent cooling fins on a condenser coil. Third, the tool is designed with an attachment area that is used to connect the tool to a vibrational source, typically a multitool.

The metal can be any metal that has a sufficient tensile strength to withstand the forces involved in the repair operation. In a preferred embodiment stainless steel pins are used. In another preferred embodiment hardened steel is used.

Figure 1:
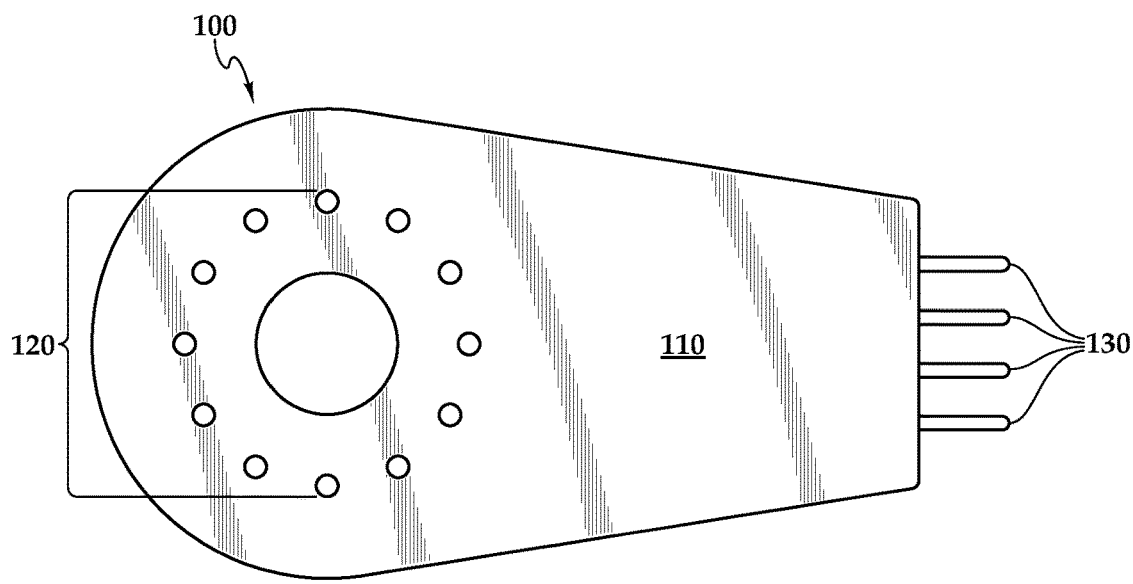
FIG. 1 is a top view of the condenser fin repair tool.
Figure 2A:
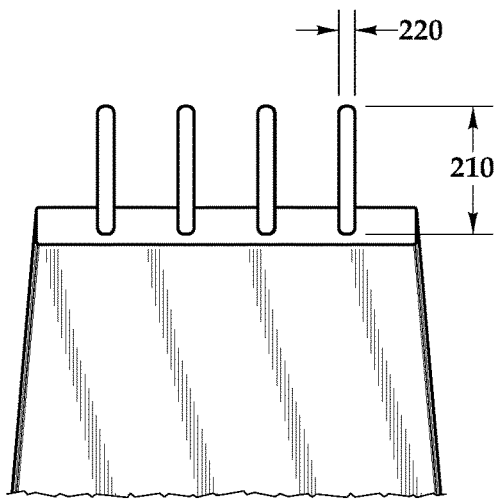
FIG. 2A is a close up of the pins on the repair tool.
Figure 2B:
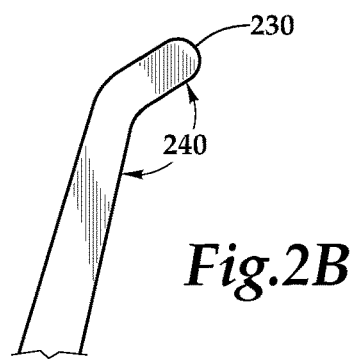
FIG. 2B is a close up of a single pin.
Figure 3:
FIG. 3 is a side view of the condenser fin repair tool.

In a preferred embodiment, illustrated in FIGS. 1 through 3, the tool 100 is composed of a base 110, an attachment area 120 and a plurality of pins 130.

The base 110 is generally planer. The attachment area 120 is preferably designed for attachment to a multitool, although any vibrational source and any means of firm attachment will function equally well as the specific examples disclosed.

The preferred pin width, or cross sectional diameter 220, for common condenser fin designs is about 0.047 inches. Although for more densely packed fins a narrower pin can be used and for less densely packed fins wider pins can be used. The preferred pin length 210 is about 0.40 inches.

In an alternative embodiment, the tip 230 of the pins can be angled 240. This can be useful to avoid damaging the coil while straightening the fins. A preferred tip angle is to be offset about 22 degrees from the central axis of the body of the pin.

It is critical that the pins be spaced apart so that they do not enter grooves from adjacent fins. In a preferred embodiment the spacing is such that the grooves are about 8 fins apart. In another preferred embodiment the spacing can be such that the pins enter grooves ranging from 7, 8 or 9 fins apart. In still another embodiment, the pins can be spaced apart to that they enter grooves from 5 fins to 10 fins apart.

In certain instances, for example, very condenser large arrays, a tool could be designed so that the pins entered groves only about 3 or 4 fins apart.

The actual distance between pins depends upon the type of condenser coil fin array being repaired. Coils come in a variety of fin densities. For example, fins can be set apart at 15 per inch, 14 per inch, 12 per inch, 10 per inch, 9 per inch and 8 per inch. Obviously, the pin spacing distance to enter grooves every 8th fin will be smaller for a 15 fin per inch fin array than for a 8 fin per inch array.

Figure 4A:
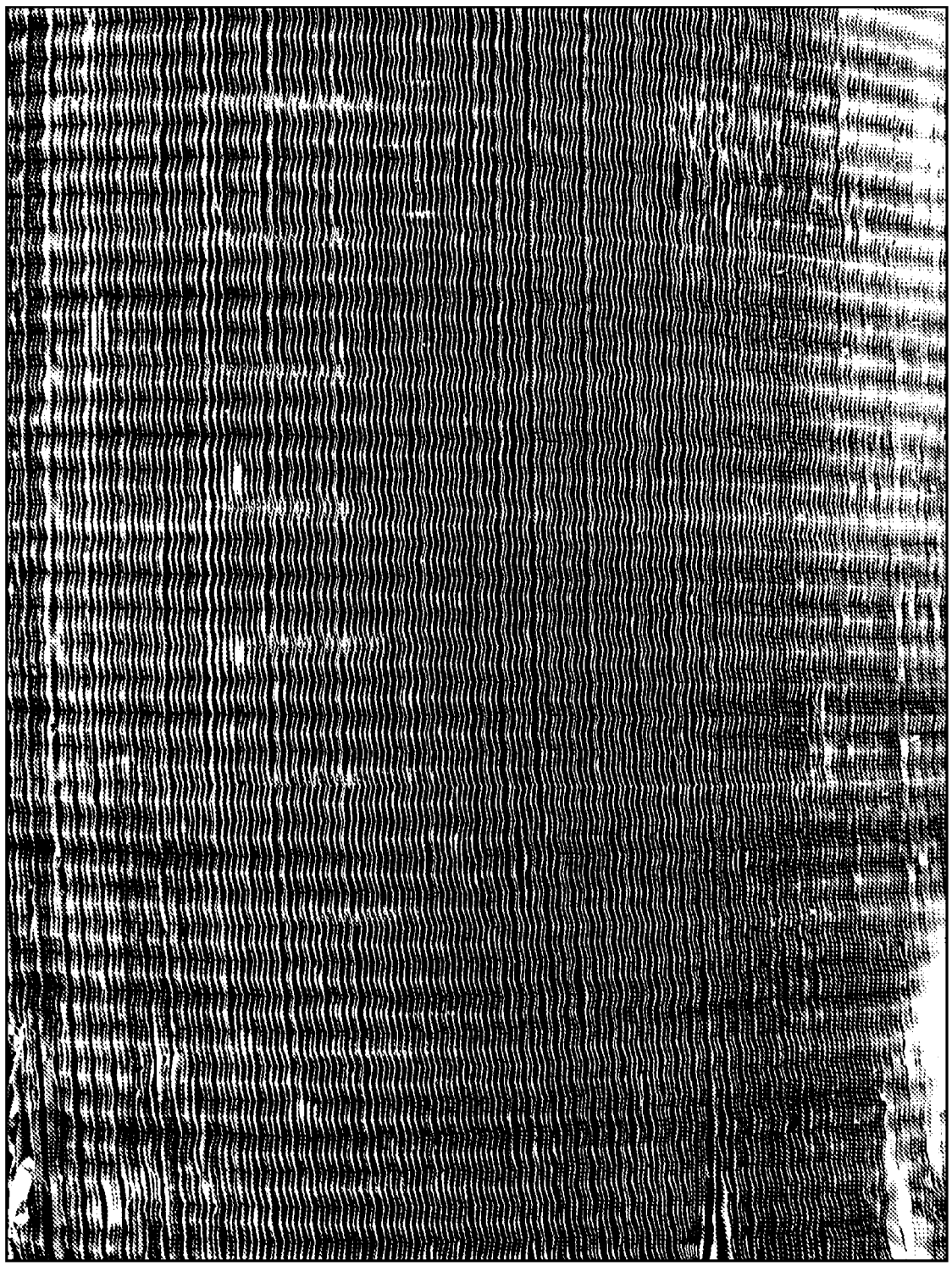
FIGS. 4A-4D are a series of views of a condenser fin array showing the steps of fin repair.
Figure 4B:
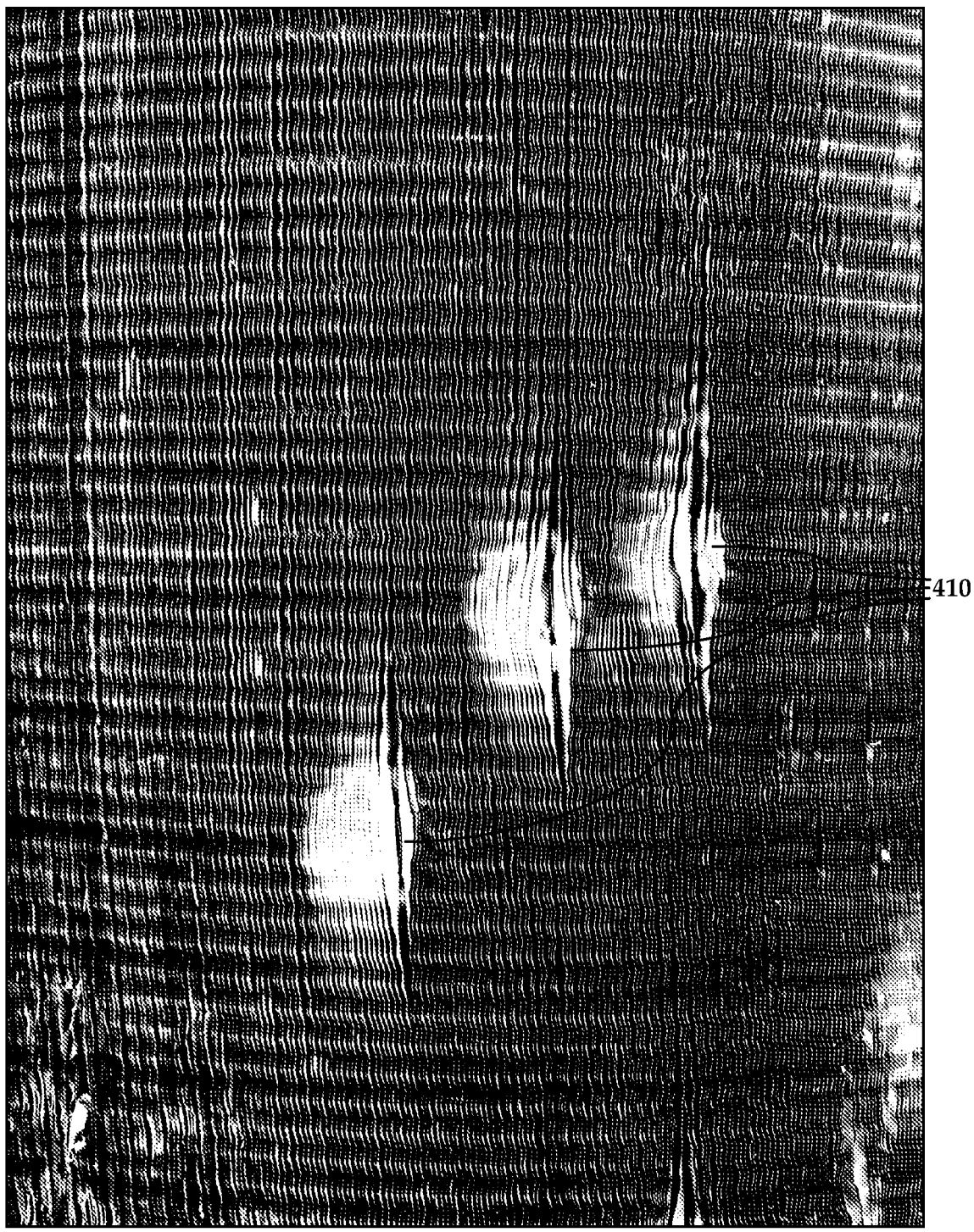

The method of repair is illustrated in FIGS. 4A-4D. An undamaged condenser coil array is illustrated in FIG. 4A. In FIG. 4B there are areas of damage 410. The fin repair tool is attached to a vibrational source, in a preferred embodiment, to a multitool. The tool is then inserted into the fin array adjacent to the area of damage. The multitool typically has a trigger in which the amount the trigger is depressed is proportional to the vibration frequency. When the tool is advanced into an area of great damage—fins that are severely bent—the trigger is depressed so that vibration is increased, and the tool is advanced into and through the area of great damage.

In contrast, when areas of less damage—fins that are less severely bent—the trigger is depressed to a lesser degree as the tool passes through these areas.

The user will quickly gain a feel for the proper amount of vibration to apply based on the degree of damage. Generally speaking the user will feel a resistance to movement when the vibration frequency is too low. The user will then slowly increase the vibration frequency until the resistance lowers and the tool advances through the grooves.

Figure 4C:
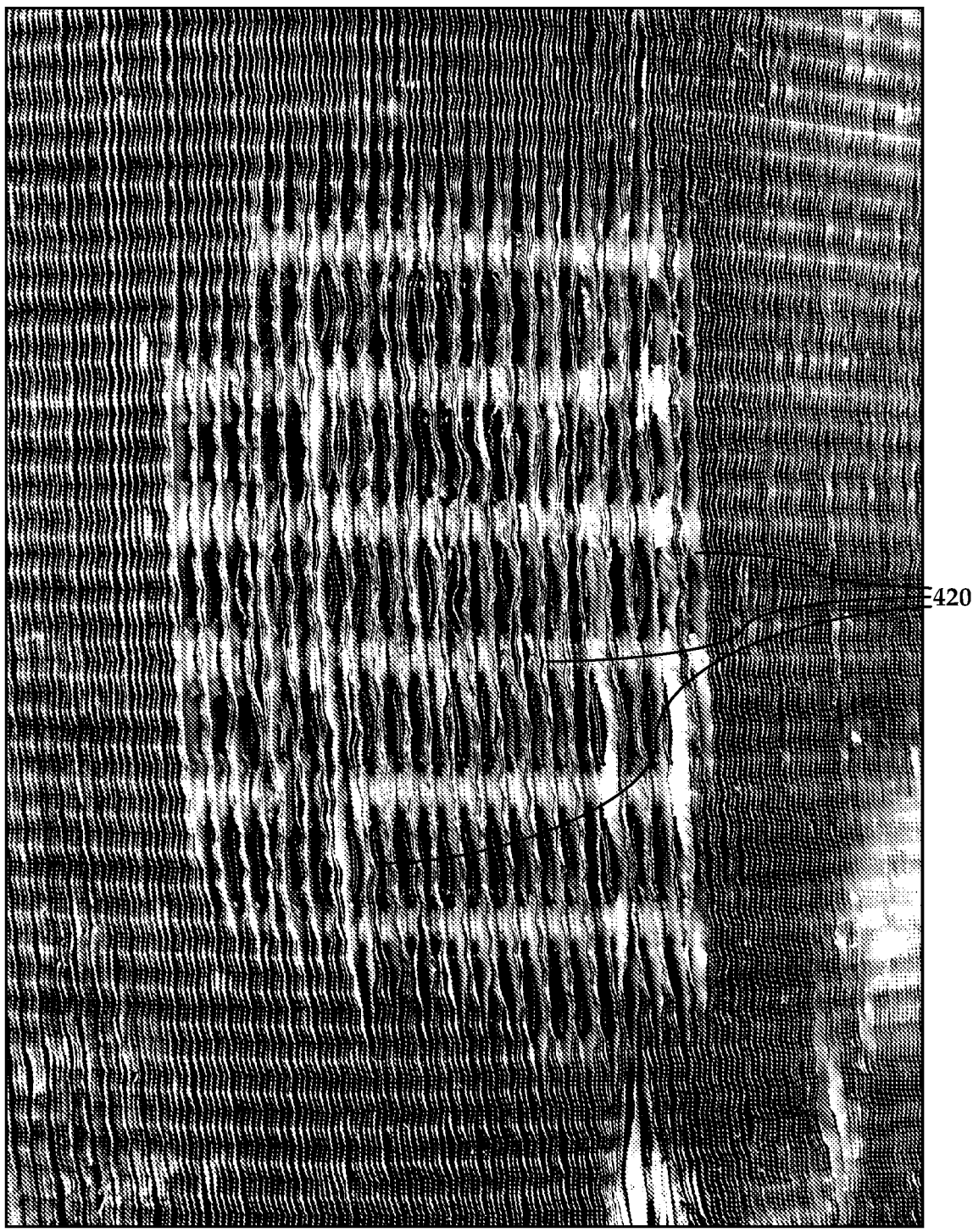

FIG. 4C illustrates the damaged areas after the tool has passed through. Note on close inspection that the grooves present every 8th fin have been cleared. The repair tool has acted on batches of eight fins and partially straightened them.

Figure 4D:
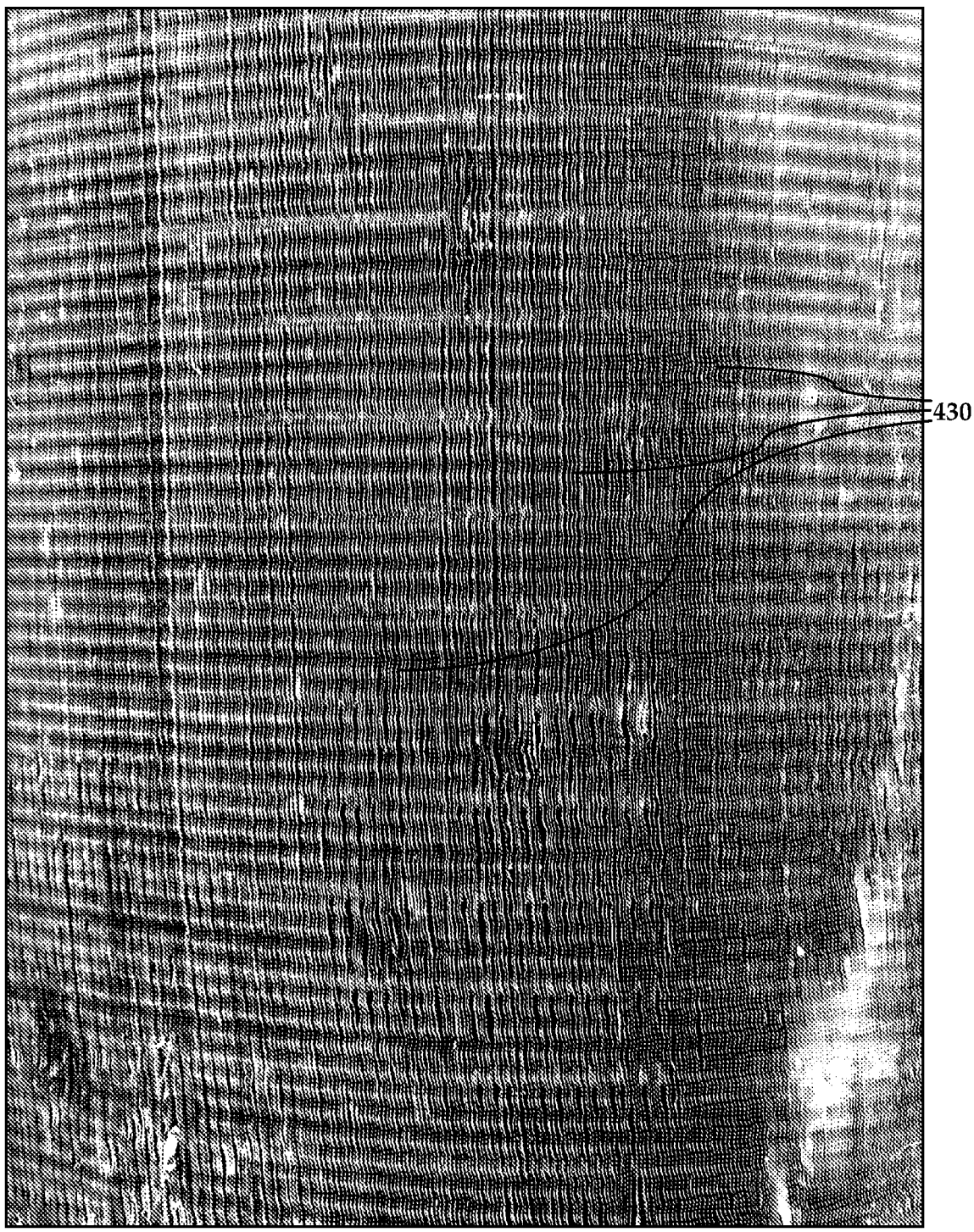
Figure 5:
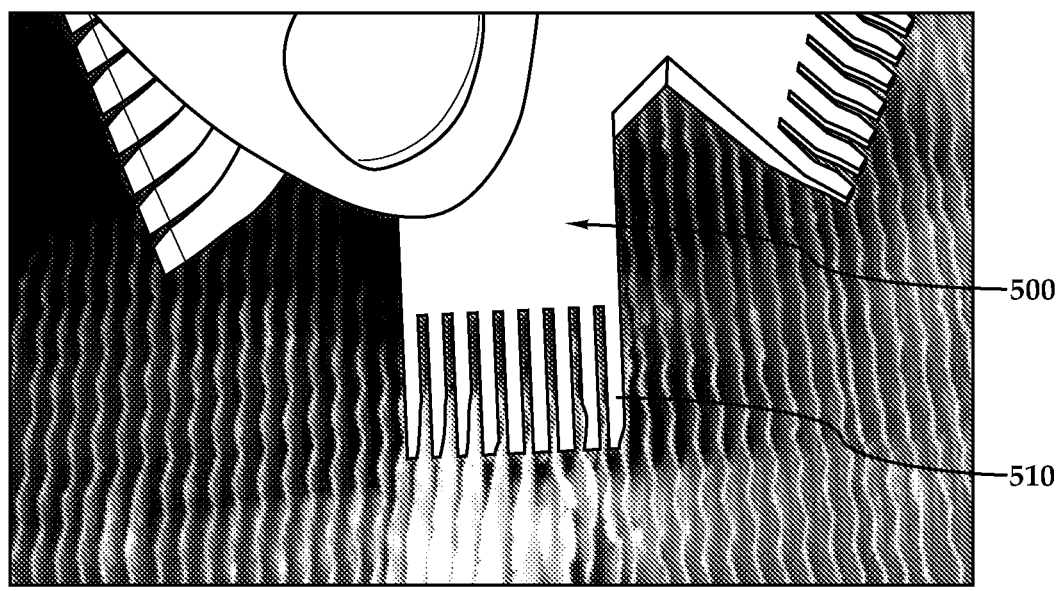
FIG. 5 is a comb used to finish the repair of a condenser fin array after the tool has been used.

FIG. 4D illustrates the fin array after the partially straightened areas are finished with a standard fin repair comb as illustrated in FIG. 5. It is no longer possible to identify the damaged areas 430 readily identified in FIG. 4B.

As shown in FIG. 5, the comb 500 has tines 510 that fit in every groove. After the fin repair tool generates the partially straightened region, the comb can be readily advanced through and finish straightening the fins. The condenser coil repair is now complete.

What is claimed is:

1. A condenser coil fin repair tool comprising: a generally planar shaped base and a plurality of metal pins,
   the pins' cross-sectional diameter being small enough to fit in grooves between adjacent fins of a condenser coil,
   the base further comprising a vibrational source connector region,
   the pins having a first end imbedded into to the base edge such that the pins' longitudinal axes extends perpendicularly out from the edge,
   the pins being spaced apart and having a second end configured to enter non-adjacent grooves between fins in a condenser coil fin array,
   wherein the tool is configured such that when attached to a vibrational source by way of the vibrational source connector region, the pins can be inserted into the non-adjacent grooves of the fin array near an area of bent fins and the tool can be readily advanced through the area, straightening the bent fins and thus repairing the condenser coil.

2. The condenser coil fin repair tool as defined in claim 1 further comprising: the pins extending out mutually parallel.

3. The condenser coil fin repair tool as defined in claim 1 further comprising: the pins extending out mutually parallel and into a space generally co-planer with the base.

4. The condenser coil fin repair tool as defined in claim 1 further comprising: the pins spaced a distance range such that the second ends enter grooves from 5 to 10 fins apart.

5. The condenser coil fin repair tool as defined in claim 1 further comprising: the pins spaced a distance such that the second ends enter grooves 7 fins apart.

6. The condenser coil fin repair tool as defined in claim 1 further comprising: the pins spaced a distance such that the second ends enter grooves 8 fins apart.

7. The condenser coil fin repair tool as defined in claim 1 further comprising: the pins spaced a distance such that the second ends enter grooves 9 fins apart.

8. The condenser coil fin repair tool as defined in claim 1 wherein the pins are made of stainless steel.

9. The condenser coil fin repair tool as defined in claim 1 wherein the pins are made of hardened steel.

10. The condenser coil fin repair tool as defined in claim 1 wherein the pins extend out from the base about 0.40 inches.

11. The condenser coil fin repair tool as defined in claim 1 wherein the pins cross-sectional diameter is about 0.047 inches.

12. The condenser coil fin repair tool as defined in claim 1 wherein the pin seconds ends further comprise a tip bend downward at an angle of about 22 degrees.

13. The condenser coil fin repair tool as defined in claim 1 wherein the plurality of pins further comprises two to eight pins.

14. The condenser coil fin repair tool as defined in claim 1 wherein the plurality of pins further comprises 3 to 5 pins.

15. The condenser coil fin repair tool as defined in claim 1 wherein the plurality of pins further comprises four pins.

16. A method of condenser coil fin repair comprising:
    a condenser coil fin repair tool comprising:
    a generally planar shaped base and a plurality of metal pins,
       the pins' cross-sectional diameter each being small enough to fit into a groove between adjacent fins of a condenser coil,
    the base further comprising a vibrational source connector region,
       the pins having a first end imbedded into to the base edge such that the pins' longitudinal axes extend perpendicularly out from the edge,
       the pins being spaced apart and having a second end configured to enter non-adjacent grooves between fins in a condenser coil fin array,
       wherein the condenser coil fins are repaired by the following steps:
       the tool is attached to a vibrational source with the vibrational source connector region,
       the pins are inserted into the non-adjacent grooves between the fins near an area of bent fins in a condenser coil fin array,
       the vibrational source is activated and the tool is advanced through the area of bent fins with the pins traveling along the non-adjacent grooves and partially straightening the fins,
       a comb having tines spaced such that they enter every groove between the fins is advanced through the area of partially straightened fins and straightens each fin, and
       the process is repeated at each area of bent fins in the condenser fin array,
    wherein the fins in each area of bent fins are straightened and the condenser coil fins are repaired.

17. The method of condenser coil fin repair as defined in claim 16 wherein the pins spaced apart further comprises pins spaced apart to enter groves separated by 6 to 10 fins.

18. The method of condenser coil fin repair as defined in claim 16 further comprising the step of:
    adjusting the frequency of vibration depending on the severity of bending in the area of bent fins such that when the tool is passing through areas of severely bent fins the vibration frequency is increased and when the tool is passing through areas of less severely bent fins the vibration frequency is decreased.

19. The method of condenser coil fin repair as defined in claim 16 wherein the vibrational source further comprises a multitool.

20. The method of condenser coil fin repair as defined in claim 16 wherein the pins extend from the base about 0.40 inches.

* * * * *